US007455932B2

(12) United States Patent
Fujimoto et al.

(10) Patent No.: US 7,455,932 B2
(45) Date of Patent: Nov. 25, 2008

(54) NONAQUEOUS ELECTROLYTE SECONDARY BATTERY

(75) Inventors: Hiroyuki Fujimoto, Kobe (JP); Akira Kinoshita, Kobe (JP); Toyoki Fujihara, Naruto (JP); Shingo Tode, Kobe (JP); Yasufumi Takahashi, Kobe (JP); Ikuro Nakane, Kobe (JP); Shin Fujitani, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 105 days.

(21) Appl. No.: 10/542,046

(22) PCT Filed: Jan. 15, 2004

(86) PCT No.: PCT/JP2004/000224

§ 371 (c)(1),
(2), (4) Date: Jul. 13, 2005

(87) PCT Pub. No.: WO2004/066422

PCT Pub. Date: Aug. 5, 2004

(65) Prior Publication Data

US 2006/0127769 A1 Jun. 15, 2006

(30) Foreign Application Priority Data

Jan. 17, 2003 (JP) .............................. 2003-009503

(51) Int. Cl.
*H01M 4/50* (2006.01)
*H01M 4/52* (2006.01)
(52) U.S. Cl. .................. 429/231.1; 429/223; 429/224; 429/231.3

(58) Field of Classification Search .............. 429/231.1, 429/223, 224, 231.3
See application file for complete search history.

(56) References Cited

U.S. PATENT DOCUMENTS 6,767,671 B2 * 7/2004 Itagaki et al. ................ 429/328
2005/0233217 A1 * 10/2005 Fujihara et al. ............ 429/231.1

FOREIGN PATENT DOCUMENTS

JP 07-142093 * 6/1995

(Continued)

OTHER PUBLICATIONS

Yoshio, Masaki et al., "Preparation and Properties of $LiCo_yMn_xNi_{1-x-y}O_2$ as a Cathode for Lithium Ion Batteries," *Journal of Power Sources*, vol. 90, pp. 176-181, 2000.
Lu, Zhonghua et al., "Layered $Li[Ni_xCo_{1-2x}Mn_x]O_2$ Cathode Materials for Lithium-Ion Batteries," *Electrochemical and Solid-State Letters*, 4 (12) pp. A200-A203, 2001.

*Primary Examiner*—Patrick Ryan
*Assistant Examiner*—Angela Martin
(74) *Attorney, Agent, or Firm*—Kubovcik & Kubovcik

(57) ABSTRACT

A nonaqueous electrolyte secondary battery wherein a material capable of occluding/discharging lithium is used as a negative electrode material and a lithium-transition metal composite oxide which contains Ni and Mn as the transition metal and has a layered structure is used as a positive electrode material is characterized in that a lithium-transition metal composite oxide having a BET specific surface area less than 3 $m^2/g$ and a pH of 11.0 or less when 5 g of the lithium-transition metal composite oxide is immersed in 50 ml of purified water is used as the positive electrode active material.

8 Claims, 6 Drawing Sheets

FOREIGN PATENT DOCUMENTS

| | | | |
|---|---|---|---|
| JP | 7-142093 A | | 6/1995 |
| JP | 2561556 B2 | | 9/1996 |
| JP | 2000-235868 | * | 8/2000 |
| JP | 2000-235868 A | | 8/2000 |
| JP | 3244314 B2 | | 10/2001 |
| JP | 2002-042813 | * | 2/2002 |
| JP | 2002-42813 A | | 2/2002 |
| JP | 2002-145623 | * | 5/2002 |
| JP | 2002-145623 A | | 5/2002 |
| JP | 2002-203552 | * | 7/2002 |
| JP | 2002-203552 A | | 7/2002 |
| JP | 2003-7298 A | | 1/2003 |

* cited by examiner

NONAQUEOUS ELECTROLYTE SECONDARY BATTERY

This application is a 371 of international application PCT/JP2004/000224, which claims priority based on Japanese patent application No. 2003-009503 filed Jan 17, 2003, which is incorporated herein by reference.

TECHNICAL FIELD

The present invention relates to a nonaqueous electrolyte secondary battery and particularly to a nonaqueous electrolyte secondary battery using a lithium transition metal complex oxide containing Ni and Mn as the positive electrode material.

BACKGROUND ART

In recent years, nonaqueous electrolyte batteries using carbon material, metallic lithium or lithium-alloying material for the negative active material and a lithium transition metal complex oxide represented by $LiMO_2$ (M indicates a transition metal) for the positive active material have been noted as high-energy-density secondary batteries.

A representing example of the lithium transition metal complex oxide is a lithium cobalt complex oxide (lithium cobaltate: $LiCoO_2$). This complex oxide has been already put to practical use as the positive active material of nonaqueous electrolyte secondary batteries.

The lithium transition metal complex oxide containing Ni or Mn as the transition metal has been also studied for utility as the positive active material. For example, such compounds as containing all of those three transition metals Co, Ni, and Mn have been also studied intensively (see, for example, Japanese Patent Registration Nos. 2,561,556 and 3,244,314, and Journal of Powder Sources, 90(2000), pp 176-181).

It is reported that, among those lithium transition metal complex oxides containing Co, Ni and Mn, a compound containing the same percentage composition of Ni and Mn, as represented by the formula $LiMn_xNi_xCo_{(1-2x)}O_2$, shows characteristically high thermal stability even in the charged state (high oxidation state) (Electrochemical and Solid-State Letters, 4(12), A200-A203(2001)).

It is also reported that the aforementioned complex oxide containing substantially the same percentage composition of Ni and Mn has a voltage of around 4 V, comparable to a voltage of $LiCoO_2$, and shows a high capacity and a good charge-discharge efficiency (Japanese Patent Laying-Open No. 2002-42813). Thus, batteries using such a lithium transition metal complex oxide (such as represented by the formula $LiaMn_bNi_bCo_{(1-2b)}O_2$ ($0 \leq a \leq 1.2$ and $0 < b \leq 0.5$)) containing Co, Ni and Mn and having a layered structure as the positive electrode material are expected to exhibit high thermal stability even in the charged state and accordingly exhibit markedly improved battery reliability.

The inventors of this application studied performance characteristics of the secondary lithium battery using the above-described lithium transition metal complex oxide as the positive active material. As a result, they have found that when the battery is stored in the charged state at a temperature that is higher than 80° C., which temperature is estimated as the use condition of a portable phone inside an actual car, an increasing gas evolution due probably to a reaction between the positive electrode and the electrolyte solution occurs to expand or swell the battery if having a configuration suitable for insertion in the portable phone or the like. In an exemplary case where a battery casing is made of a thin aluminum alloy or a thin aluminum laminate film, the battery when stored has been found to experience significant swelling and show marked deterioration such as capacity loss.

Batteries often use an outer casing formed of a thin aluminum alloy or a thin aluminum laminate film to reduce their weights. As a solution to suppress swelling of such batteries due to gas evolution during high-temperature storage, a method is proposed wherein γ-butyrolactone is contained as a solvent for an electrolyte solution in the amount of 50-95% by volume (see, for example, Japanese Patent Laying-Open No. 2000-235868). However, in this case, because γ-butyrolactone is susceptible to decomposition at a reducing side (at a negative electrode side), the performance characteristics of the battery have been insufficient in total.

In Japanese Patent Laying-Open No. 2002-203552 and the 43rd Battery Symposium in Japan Meeting Abstracts, pp. 122-123, the use of a complex metal oxide comprised mainly of Li and Ni and having a pH value of 10.0-11.5 as the positive electrode material for a nonaqueous electrolyte secondary battery is proposed to suppress swelling of the battery during high-temperature storage. However, as a result of the detailed study on lithium transition metal complex oxides containing Ni, Mn and Co and having a layered structure, the inventors of this application have found that the use of such lithium transition metal complex oxides, even if kept within the specified pH range, results in significant swelling of the batteries during high-temperature storage in the charged state and thus the failure to obtain a sufficient improvement.

DISCLOSURE OF THE INVENTION

It is an object of the present invention to provide a nonaqueous electrolyte secondary battery using a lithium transition metal complex oxide containing Ni and Mn as the transition metal and having a layered structure, which can suppress the gas evolution during high-temperature storage in the charged state and thus exhibits improved high-temperature storage characteristics.

The nonaqueous electrolyte secondary battery of the present invention uses a material capable of storing and releasing lithium as the negative electrode material and a lithium transition metal complex oxide containing Ni and Mn as the transition metal and having a layered structure as the positive electrode material. Characteristically, the lithium transition metal complex oxide has a BET specific surface area of less than 3 $m^2/g$ and gives a pH value of not greater than 11.0 when it is immersed in purified water in the amount of 5 g per 50 ml of the purified water.

The gas evolution within the battery while stored in the charged state at elevated temperatures can be suppressed and the high-temperature storage characteristics of the battery can be improved if the lithium transition metal complex oxide has a BET specific surface area of less than 3 $m^2/g$ and gives a pH value of not greater than 11.0 when measured under the above conditions in accordance with the present invention. Hence, swelling of a battery while stored in the charged state at elevated temperatures can be prevented, even if the battery is a sealed, nonaqueous electrolyte secondary battery using an outer casing susceptible to deformation in case an internal pressure of the battery builds up.

In the present invention, the BET specific surface area of the lithium transition metal complex oxide is more preferably not greater than 2 $m^2/g$. When the BET specific surface area is kept within this range, gas evolution is further suppressed within the battery while stored in the charged state at elevated temperatures and its high-temperature storage characteristics are further improved. Although not particularly specified, it is generally preferred that a lower limit of the BET specific surface area does not fall below 0.1 m²/g.

In the present invention, the pH value of the lithium transition metal complex oxide refers to a pH value of a dispersion containing 5 g of the lithium transition metal complex oxide in 50 ml purified water, as described above. In the present invention, the pH value is specified as being not greater than 11.0. A lower limit of the pH value is preferably at least 9. Hence, the preferred pH value in the present invention is 9.0-11.0. In Japanese Patent Laying-Open No. 2002-203552, the positive active material is specified as having a pH value of 10-11.5, as described above. In the specification of Japanese Patent Laying-Open No. 2002-203552, at paragraph No. 0028, a procedure utilized to measure the pH value is described. 2 g of the positive active material is dispersed in 100 ml purified water. After about 10 minutes of stirring, the pH value is measured for the resulting filtrate. On the other hand, in the present invention, 5 g of the positive active material is introduced in 50 ml purified water. The resultant is ultrasonically treated for 10 minutes and then filtered to obtain a filtrate. The pH value is measured for the filtrate, using a glass electrode, "Model D-21" of HORIBA, Ltd.

As such, Japanese Patent Laying-Open No. 2002-203552 and the present invention utilize different procedures in the measurement of the pH value. These different measurement procedures give different pH values, as will be described hereinafter.

Japanese Patent Laying-Open No. 2002-203552 describes that an alkali content, such as lithium carbonate, which remains on a surface of the positive active material after synthesized, reacts with an electrolyte solution to generate a carbon dioxide or hydrocarbon gas that swells a battery. This reference also describes that generation of such a gas during high-temperature storage can be suppressed by reducing a residual lithium carbonate content, i.e., adjusting the pH value of the active material to 11.5 or below. Also, in the 43rd Battery Symposium in Japan Meeting Abstracts, pp. 122-123, which discloses the same technical subject as in Japanese Patent Laying-Open No. 2002-203552, battery swelling is described to occur as carbon dioxide absorbed in the remaining alkali content is released during high-temperature storage.

The positive active material used in Japanese Patent Laying-Open No. 2002-203552 specifically contains Ni, Co and Al as the transition metal. As a result of detailed study on lithium transition metal complex oxides containing Ni, Mn and Co as the transition metal, the inventors of this application and the others have found out the following:

(1) Batteries in some cases swell during high-temperature storage in the charged state to experience marked deterioration of performance characteristics, even if the pH of the positive active material is kept within the range specified by Japanese Patent Laying-Open No. 2002-203552.

(2) For batteries even if using the material having a pH of higher than 11.5, i.e., having a higher residual alkali content, little swelling is observed after high-temperature storage and no substantial deterioration is observed during storage, if the batteries are stored in the discharged state.

(3) The BET specific surface area of the positive active material in some cases affects the extent of swelling after high-temperature storage in the charged state and the degree of deterioration during storage of the battery, even if the pH of the positive active material is kept within the specified range.

From the foregoing, it appears that the nonaqueous electrolyte secondary battery using a lithium transition metal complex oxide containing Ni, Mn and Co and having a layered structure experiences swelling during high-temperature storage in the charged state due to a gas generated by a reaction between the positive active material and the electrolyte solution, as contrary to the description of Japanese Patent Laying-Open No. 2002-203552 which attributes the battery swelling to a gas generated by a reaction of the residual alkali content with the electrolyte solution or to a gas released from the residual alkali content. Although a detail is unknown, the residual alkali content is considered to act to promote the reaction between the electrolyte solution and the positive active material in the charged state.

In view of the above, the present invention specifies the positive active material as having a BET specific surface area of less than 3 m²/g and a pH value of not greater than 11.0. This is believed to reduce a reaction area between the positive active material and the electrolyte solution and also reduce the residual alkali content regarded as a promoter of a decomposition reaction, so that the reaction between the electrolyte solution and the positive active material in the charged state is suppressed.

As described hereinabove, the present invention and Japanese Patent Laying-Open No. 2002-203552 utilize different procedures for determining pH values. It appears that the hydroxide ion concentration in a filtrate when determined using the procedure of this invention is five times as high as when determined using the procedure of Japanese Patent Laying-open No. 2002-203552 is utilized. This has been confirmed by the below-described Reference Experiment wherein the pH value when determined using the procedure of this invention is about 0.7 higher than when determined using the procedure of Japanese Patent Laying-Open No. 2002-203552, which difference is almost as estimated.

The pH value of the positive active material can be adjusted to 11.0 or below by such methods as (1) rinsing the positive active material after synthesized, (2) reducing a ratio of Li to a transition metal in a charge stock before it is fired to provide the positive active material, and (3) reducing the amount of an unreacted Li compound by varying the firing condition such as a firing temperature or firing time.

In the present invention, the BET specific surface area of the lithium transition metal complex oxide is less than 3 m²/g, more preferably within 2 m²/g, further preferably within 1.2 m²/g. As described above, the reduction of the BET specific surface area leads to a smaller reaction area between the positive active material and the electrolyte solution so that a reaction between the positive active material in the charged state and the electrolyte solution can be retarded.

The lithium transition metal complex oxide for use in the present invention may preferably be represented by the formula $Li_aMn_xNi_yCo_zO_2$ (wherein a, x, y and z are numbers satisfying $0 \leq a \leq 1.2$, $x+y+z=1$, $x>0$, $y>0$ and $z \geq 0$), for example. More preferably, the complex oxide contains substantially the same amount of nickel and manganese. That is, x and y in the above formula have substantially the same value. In the lithium transition metal complex oxide, nickel in its nature has a high capacity but exhibits a low thermal stability during charge while manganese in its nature has a low capacity but exhibits a high thermal stability during charge. Accordingly, nickel and manganese are preferably contained substantially in the same amount in order to best balance their advantageous natures.

It is more preferred that x, y and z in the above formula satisfy $0.25 \leq x \leq 0.5$, $0.25 \leq y \leq 0.5$ and $0 \leq z \leq 0.5$.

When the positive and negative electrodes both have a rectangular electrode surface and the nonaqueous secondary battery has a rectangular shape, a gas generated during storage tends to stay longer particularly between the electrodes. The present invention accordingly finds a particular utility in nonaqueous secondary batteries which have a rectangular shape and accommodate positive and negative electrodes both having a rectangular electrode surface.

The positive and negative electrodes having a rectangular electrode surface can be provided in various ways. For example, the positive electrode, the negative electrode and a separator interposed therebetween may be rolled up and then compressed into a flat shape, or folded such that their electrode surfaces have a rectangular shape. Rectangular positive and negative electrodes may be stacked with a separator between them.

Swelling of a battery during storage occurs due to the buildup of a battery's internal pressure that results from the gas generation during storage. The present invention thus finds a particular utility in sealed, nonaqueous secondary batteries using an outer casing susceptible to deformation in case of internal pressure buildup.

An outer casing composed at least partly of an aluminum alloy or aluminum laminate film having a thickness of up to 0.5 mm is susceptible to deformation in case of internal pressure buildup, for example. In the present invention, the aluminum laminate film refers to a laminate film having an aluminum foil laminated at both sides with a plastic film. The plastic film is generally made of polypropylene or polyethylene. An outer casing composed at least partly of an iron alloy having a thickness of up to 0.3 mm is also susceptible to deformation in case of internal pressure buildup. As the battery's internal pressure increases, such outer casings undergo deformation in a manner to swell at portions composed of those materials.

The negative electrode material for use in the present invention is capable of storing and releasing lithium. Any material can be used, so long as it is generally useful for the negative electrodes of a nonaqueous electrolyte secondary battery. Examples of useful negative electrode materials include graphite materials, metallic lithium and Li-alloying materials. Examples of Li-alloying materials include silicon, zinc, germanium and aluminum.

The electrolyte for use in the nonaqueous electrolyte secondary battery of the present invention can be selected, without limitation, from those known to be useful for nonaqueous electrolyte secondary batteries such as secondary lithium batteries. The type of the electrolyte solvent is not particularly specified and can be illustrated by a mixed solvent of cyclic carbonate and chain carbonate. Examples of cyclic carbonates include ethylene carbonate, propylene carbonate, butylene carbonate and vinylene carbonate. Examples of chain carbonates include dimethyl carbonate, ethyl methyl carbonate and diethyl carbonate. The electrolyte solvent can also be illustrated by a mixed solvent of the aforementioned cyclic carbonate and an ether solvent such as 1,2-dimethoxyethane or 1,2-diethoxyethane. Preferably, the ratio by volume of the cyclic carbonate to the chain carbonate or ether solvent (cyclic carbonate/chain carbonate or ether solvent) is 10/90 -70/30.

The type of the electrolyte solute is not particularly specified and can be illustrated by $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$ and mixtures thereof.

BEST MODE FOR CARRYING OUT THE INVENTION

Figure 1:
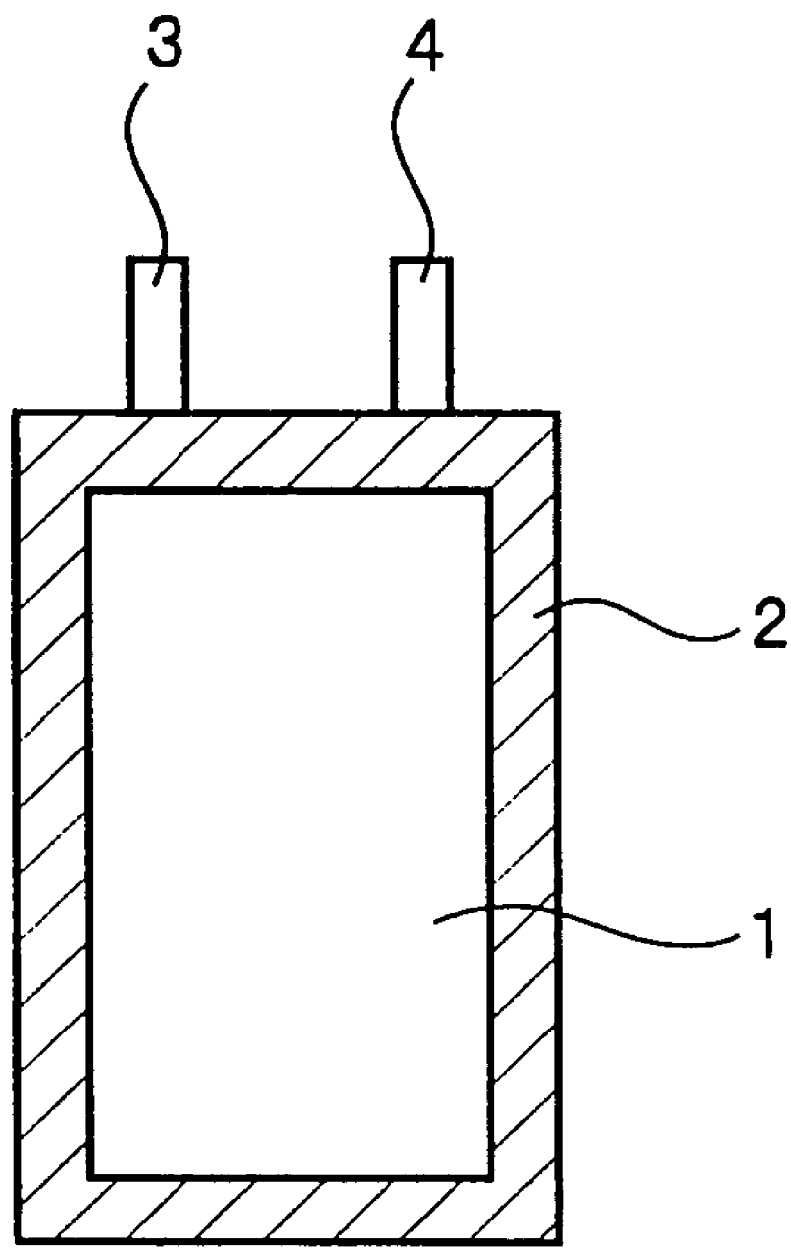
FIG. 1 is a plan view, showing the secondary lithium battery fabricated in Examples in accordance with the present invention.

The present invention is below described in more detail by way of Examples. It will be recognized that the following examples merely illustrate the practice of the present invention but are not intended to be limiting thereof. Suitable changes and modifications can be effected without departing from the scope of the present invention.

EXAMPLE 1

(Preparation of Positive Active Material)

$Li_2CO_3$ and a coprecipitated hydroxide represented by $Mn_{0.33}Ni_{0.33}Co_{0.34}(OH)_2$ were mixed in an Ishikawa automated mortar such that a ratio in mole of Li to a group of the transition metals Mn, Ni and Co was brought to 1:1, heat treated in the ambient atmosphere at 950° C. for 20 hours and then pulverized to obtain a lithium transition metal complex oxide having a mean secondary particle diameter of about 5 µm and represented by $LiMn_{0.33}Ni_{0.33}Co_{0.34}O_2$.

The obtained lithium transition metal complex oxide was rinsed with running water for 24 hours and then heat dried to provide a positive active material. The resulting positive active material had a BET specific surface area of 1.2 $m^2/g$.

(PH Value Measurement)

The obtained lithium transition metal complex oxide, weighing 5 g, was introduced in a 100 ml beaker to which 50 ml of purified water was subsequently added. The beaker contents were ultrasonically treated for 10 minutes and then filtered to collect a filtrate. A pH value of the filtrate was measured using a glass electrode pH sensor (product of HORIBA, Ltd., model D-21). Measurement was performed twice and an average value was recorded as a pH value. The pH value was 10.66.

(Fabrication of Positive Electrode)

The above-prepared positive active material, carbon as an electrical conductor and polyvinylidene fluoride as a binder were mixed in the ratio (active material:conductor:binder) by weight of 90:5:5 and then added to N-methyl-2-pyrrolidone as a dispersing medium which was subsequently kneaded to prepare a cathode mix slurry. The prepared slurry was coated on an aluminum foil as a current collector, dried and then rolled by a pressure roll. Subsequent attachment of a current collecting tab completed fabrication of a positive electrode.

(Fabrication of Negative Electrode)

Artificial graphite as a negative active material and a styrene-butadiene rubber as a binder were mixed in an aqueous solution of carboxymethylcellulose as a thickener so that the mixture contained the active material, binder and thickener in the ratio by weight of 95:3:2. The mixture was then kneaded to prepare an anode mix slurry. The prepared slurry was applied onto a copper foil as a current collector, dried and rolled by a pressure roll. Subsequent attachment of a current collecting tab completed fabrication of a negative electrode.

(Preparation of Electrolyte Solution)

1 mole/liter of $LiPF_6$ was dissolved in a mixed solvent containing ethylene carbonate (EC) and ethyl methyl carbonate (EMC) at a 3:7 ratio by volume to prepare an electrolyte solution.

(Construction of Battery)

The above-fabricate positive and negative electrodes were stacked in a pile with a separator between them, wound and then pressed into a flat shape to provide an electrode group. In a glove box maintained under an argon atmosphere, this electrode group was inserted into an inner space of an outer casing made of a 0.11 mm thick aluminum laminate. After introduction of the electrolyte solution, the outer casing was sealed to encapsulate them.

FIG. 1 is a plan view, showing the secondary lithium battery A1 constructed in the manner as described above. In this secondary lithium battery, the aluminum laminate outer casing 1 is heat sealed at its periphery to form a sealed portion 2 for encapsulation. A positive current collecting tab 3 and a negative current collecting tab 4 extend from an upper portion of the outer casing 1. Standard dimensions of the battery were 3.6 mm in thickness, 3.5 cm in width and 6.2 cm in length. The constructed battery measured an initial thickness of 3.55 mm.

EXAMPLE 2

The procedure of Example 1 was followed, except that the firing temperature in the preparation of the positive active material was changed to 850° C., to construct a nonaqueous secondary battery A2. The resulting active material had a BET specific surface area of 2.0 $m^2/g$ and a pH value of 10.84.

EXAMPLE 3

The procedure of Example 1 was followed, except that LiOH was used as the Li source, the firing temperature was changed to 1,000° C. and the firing time was changed to 30 hours, to construct a nonaqueous secondary battery A3. The resulting active material had a BET specific surface area of 0.40 $m^2/g$ and a pH value of 10.61.

COMPARATIVE EXAMPLE 1

The procedure of Example 1 was followed, except that LiOH was used as the Li source, the firing temperature was changed to 1,000° C. and the rinsing treatment was excluded, to construct a nonaqueous secondary battery B1. The resulting active material had a BET specific surface area of 0.60 $m^2/g$ and a pH value of 11.12.

COMPARATIVE EXAMPLE 2

The procedure of Example 1 was followed, except that the ratio in mole of Li to the group of transition metals was changed to 1.15, firing was performed at 1,000° C. for 30 hours and the rinsing treatment was excluded, to construct a nonaqueous secondary battery B2. The resulting active material had a BET specific surface area of 0.20 $m^2/g$ and a pH value of 11.64.

(High-Temperature Storage Characteristics Evaluation)

Each of the above-constructed batteries A1, A2, A3, B1 and B2 was charged at room temperature at a constant current of 650 mA to a voltage of 4.2 V, further charged at a constant voltage of 4.2 V to a current value of 32 mA and then discharged at a constant current of 650 mA to a voltage of 2.75 V to measure a discharge capacity (mAh) of the battery before storage.

Next, each battery was charged at room temperature at a constant current of 650 mA to a voltage of 4.2 V, further charged at a constant voltage of 4.2 V to a current value of 32 mA and then stored in a thermostatic chamber at 85° C. for 3 hours. After storage, the battery was cooled at room temperature for 1 hour and then measured for thickness. A thickness increase (mm) was calculated from comparison between the measured thickness and the initial thickness of the battery and was evaluated as swelling of the battery after high-temperature storage.

The pH values and BET specific surface areas of respective positive active materials of the batteries, as well as the swelling evaluation results of the batteries after storage, are listed in Table 1. The swelling rate for each battery is expressed as thickness increase/initial battery thickness×100.

TABLE 1

| | Battery | pH Value of Positive Active Material | BET Value of Positive Active Material ($m^2/g$) | Battery Swelling After High-Temperature Storage (mm) | Swelling Rate of Battery (%) |
|---|---|---|---|---|---|
| Ex. 1 | A1 | 10.66 | 1.2 | 0.52 | 15 |
| Ex. 2 | A2 | 10.84 | 2.0 | 0.94 | 26 |
| Ex. 3 | A3 | 10.61 | 0.40 | 0.43 | 12 |
| Comp. Ex. 1 | B1 | 11.12 | 0.60 | 2.85 | 75 |
| Comp. Ex. 2 | B2 | 11.64 | 0.20 | 2.56 | 69 |

As can be appreciated from the results shown in Table 1, the batteries A1-A3 of Examples 1-3 in accordance with the present invention, each using the positive active material having a pH value of not greater than 11.0 and a BET specific surface area of less than 3 m²/g, experience little swelling during storage and thus show small swelling rates after storage.

Next, each battery after storage was discharged at room temperature at a constant current of 650 mA to a voltage of 2.75 V to measure the remaining capacity (mAh). The value obtained by dividing the remaining capacity by the discharge capacity of the battery before storage was recorded as a retention rate.

After measurement of the remaining capacity, the battery was charged at a constant current of 650 mA to a voltage of 4.2 V, further charged at a constant voltage of 4.2 V to a current value of 32 mA and then discharged at a constant current of 650 mA to a voltage of 2.75 V to measure a restored capacity. The value obtained by dividing the restored capacity by the discharge capacity of the battery before storage was recorded as a restoration rate.

The thus measured discharge capacity before storage, remaining capacity, retention rate, restored capacity and restoration rate for each battery are shown in Table 2.

TABLE 2

| | Battery | BET Value of Positive Active Material (m²/g) | Discharge Capacity Before Storage (mAh) | Remaining Capacity (mAh) (Retention Rate) | Restored Capacity (mAh) (Restoration Rate) |
|---|---|---|---|---|---|
| Ex. 1 | A1 | 1.2 | 643.2 | 561.3 (87.3%) | 578.5 (89.9%) |
| Ex. 2 | A2 | 2.0 | 630.1 | 538.0 (85.4%) | 551.2 (87.5%) |
| Ex. 3 | A3 | 0.40 | 600.6 | 510.9 (85.1%) | 528.6 (88.0%) |
| Comp. Ex. 1 | B1 | 0.60 | 673.0 | 483.8 (71.9%) | 506.3 (75.2%) |
| Comp. Ex. 2 | B2 | 0.20 | 682.1 | 526.2 (77.1%) | 551.2 (80.8%) |

As can be clearly seen from Table 2, the remaining capacity after high-temperature storage and the restoration capacity are both high in the batteries A1-A3 of Examples 1-3 in accordance with the present invention. This demonstrates that the batteries in accordance with the present invention show improved high-temperature storage characteristics.

As can also be appreciated from Tables 1 and 2, the batteries of Examples 1 and 3, each using the positive active material having a BET specific surface area of not greater than 1.2 m²/g, show particularly reduced swelling and deterioration after storage. This suggests that the BET specific surface area is more preferably not greater than 1.2 m²/g.

(Observation of Negative Electrode Condition After Storage Test)

Figure 2:
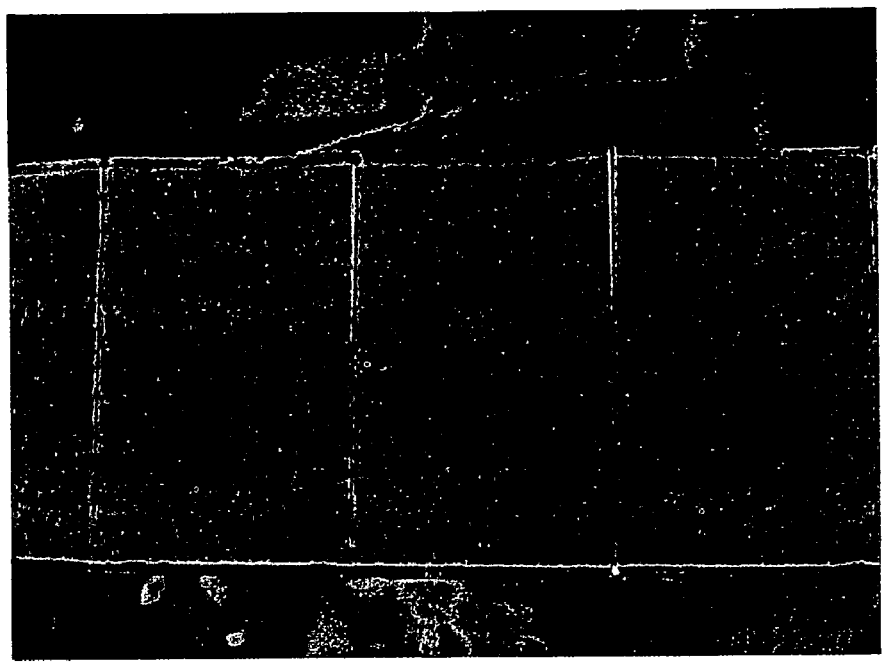
FIG. 2 is a photograph, showing the condition of the negative electrode (top surface) of the battery of Example 1 in accordance with the present invention, when charged after the storage test.
Figure 3:
FIG. 3 is a photograph, showing the condition of the negative electrode (back surface) of the battery of Example 1 in accordance with the present invention, when charged after the storage test.
Figure 4:
FIG. 4 is a photograph, showing the condition of the negative electrode (top surface) of the battery of Comparative Example 1 when charged after the storage test.
Figure 5:
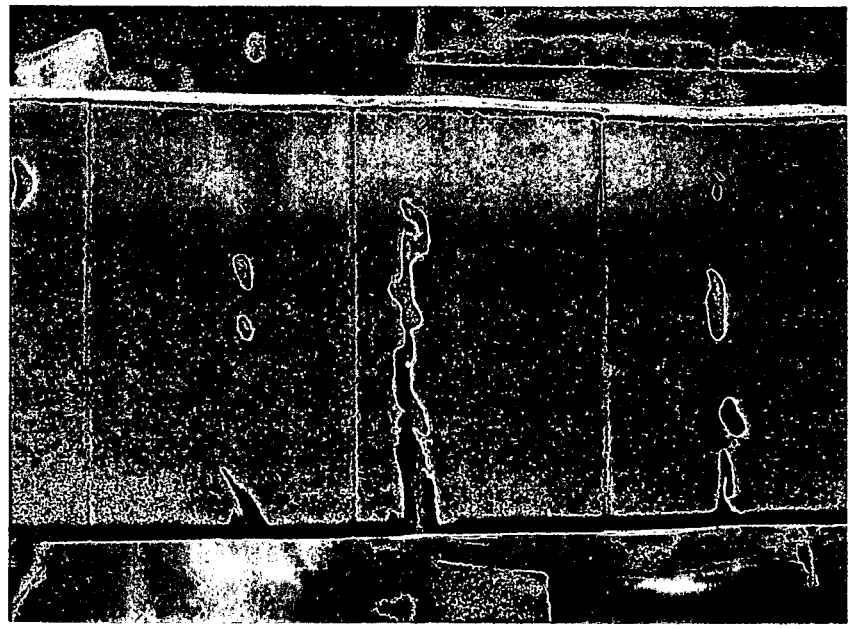
FIG. 5 is a photograph, showing the condition of the negative electrode (back surface) of the battery of Comparative Example 1 when charged after the storage test.

The condition of the negative electrode after the storage test was observed for the battery A1 of Example 1 and the battery B1 of Comparative Example 1. Specifically, each battery after the storage test was charged at a constant current of 650 mA to a voltage of 4.2 V and further charged at a constant voltage of 4.2 V to a current value of 32 mA and then disassembled to remove its negative electrode for observation. FIGS. 2 and 3 both show the negative electrode of Example 1. FIG. 2 shows its top surface and FIG. 3 shows its back surface. FIGS. 4 and 5 both show the negative electrode of Comparative Example 1. FIG. 4 shows its top surface and FIG. 5 shows its back surface.

As apparent from comparison between FIGS. 2-5, in the battery of Comparative Example 1 which showed marked swelling after the storage test, a wide distribution of unreacted dark portions is observed in a portion charged and discolored to gold (appearing white in the drawings). The formation of these unreacted dark portions is believed due to a gas which is generated during storage and stays between the electrodes in the form of bubbles that hinder a reaction at electrode portions in contact therewith.

On the other hand, in the battery of Example 1 in accordance with the present invention, such unreacted portions are not observed in the charged negative electrode. This demonstrates the uniform occurrence of a charge-discharge reaction.

It is evident from the above that the use of the lithium transition metal complex oxide having the BET specific surface area and the pH value within the respective ranges specified in the present invention reduces gas generation during storage, permits uniform occurrence of a charge-discharge reaction and suppresses deterioration of battery characteristics after high-temperature storage.

Figure 6:
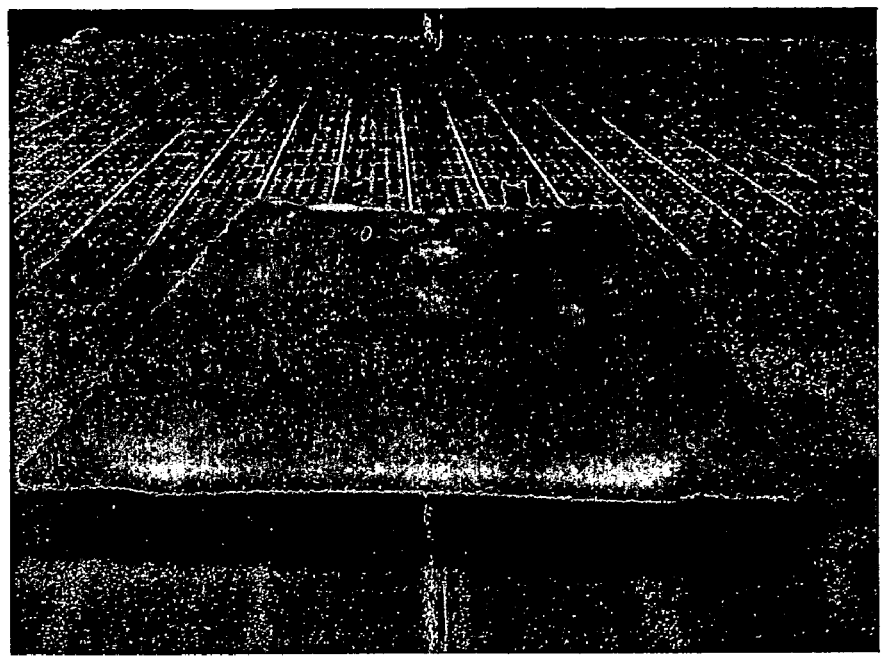
FIG. 6 is a photograph, showing the condition of the battery of Comparative Example 1 before the storage test.
Figure 7:
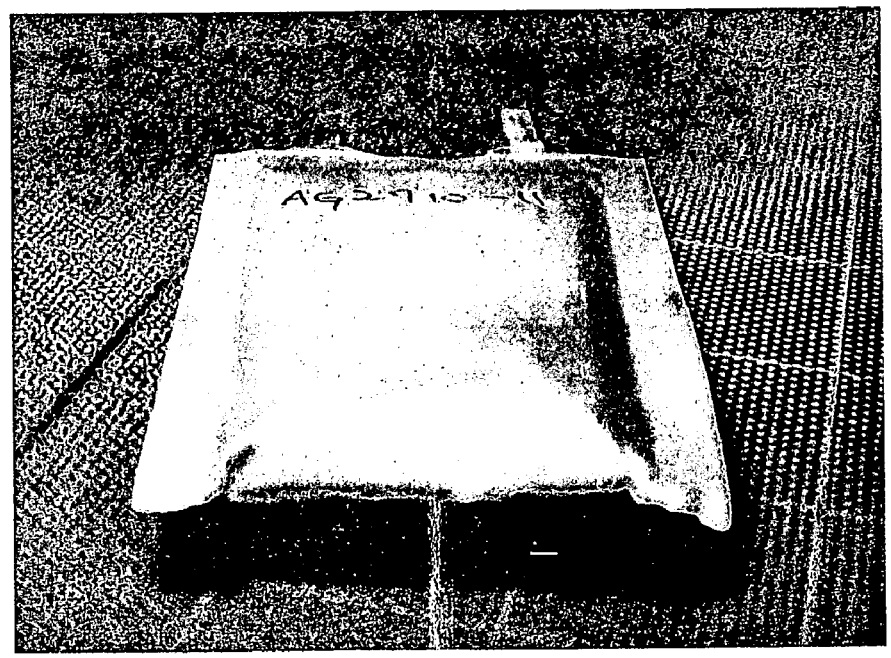
FIG. 7 is a photograph, showing the condition of the battery of Comparative Example 1 after the storage test.

FIG. 6 is a photograph which shows the battery of Comparative Example 1 before the storage test and FIG. 7 is a photograph which shows the battery of Comparative Example 1 after the storage test. As apparent from comparison between FIGS. 6 and 7, the storage test causes swelling of the outer casing of the battery.

(Reference Experiment 1)

In this Experiment, a secondary lithium battery was constructed by using an aluminum alloy can made of a 0.5 mm thick aluminum alloy sheet (Al—Mn—Mg alloy, JIS A 3005, proof stress of 14.8 kgf/mm²) as an outer casing. The occurrence of swelling was confirmed after the storage test for the secondary lithium battery in case of using such an outer casing and the positive active material of Comparative Example 1.

(Construction of Reference Battery 1)

The procedure of Example 1 was followed, except that the above-described aluminum alloy can was used as the outer casing, LiCoO₂ was used as the positive active material and the standard battery dimensions were changed to 6.5 mm in thickness, 3.4 cm in width and 5.0 cm in length, to construct a secondary lithium battery Y1. The constructed battery had an initial thickness of 6.01 mm.

(Construction of Reference Battery 2)

The procedure of Example 1 was followed, except that the above-described aluminum alloy can was used as the outer casing, the positive active material of Comparative Example 1 was used and the standard battery dimensions were changed to 6.5 mm in thickness, 3.4 cm in width and 5.0 cm in length, to construct a secondary lithium battery Y2. The constructed battery had an initial thickness of 6.04 mm.

(Evaluation of Battery Swelling After High-Temperature Storage)

Each of the above-constructed batteries was charged at room temperature at a constant current of 950 mA to a voltage of 4.2 V, further charged at a constant voltage of 4.2 V to a current value of 20 mA and then stored in a thermostatic chamber at 85° C. for 3 hours. After storage, the battery was cooled at room temperature for 1 hour and then measured for thickness. The battery swelling was evaluated after high-temperature storage in the same manner as in Example 1. The evaluation results are shown in Table 3.

TABLE 3

| | Battery | Battery Swelling After High-Temperature Storage (mm) |
|---|---|---|
| Ref. Battery 1 | Y1 | 0.25 (4.2%) |
| Ref. Battery 2 | Y2 | 1.42 (23.5%) |

As can be clearly seen from Table 3, the battery Y2 using the positive active material of Comparative Example 1 shows a very large swelling of 1.42 mm after high-temperature storage. This demonstrates that the battery deforms due to an increasing internal pressure even when it uses the 0.5 mm thick aluminum alloy can as its outer casing. It is therefore expected that when the present invention is applied to a battery using such an outer casing, gas generation within the battery during high-temperature storage can be retarded to result in a marked reduction of battery swelling.

(Reference Experiment 2)

In order to investigate a cause of deterioration of the battery of Comparative Example 1 in storage, the battery after the storage test was disassembled, its positive electrode was collected and subjected to the following experiment.

(Characteristic Experiment of Electrode)

Figure 8:
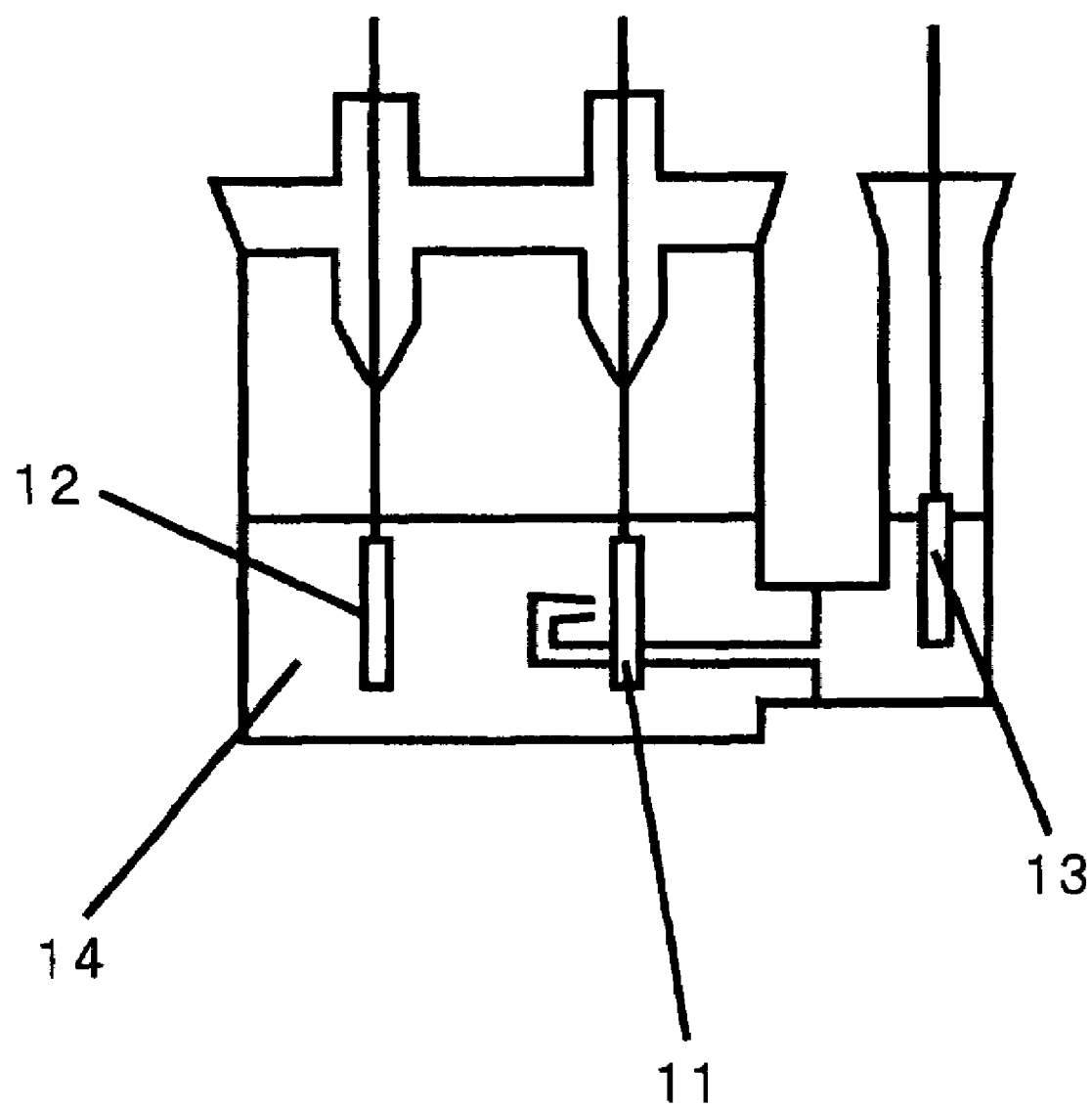
FIG. 8 is a schematic sectional view, showing a three-electrode beaker cell.

The three-electrode beaker cell shown in FIG. 8 was constructed using the above-collected positive electrode as a working electrode, a lithium metal as counter and reference electrodes, and an electrolyte solution prepared by dissolving 1 mole/liter of $LiPF_6$ in a mixed solvent (EC/EMC=3/7 (volume ratio)) of ethylene carbonate (EC) and ethyl methyl carbonate (EMC). As shown in FIG. 8, the working electrode 11, the counter electrode 12 and reference electrode 13 are immersed in the electrolyte solution 14.

The constructed cell was charged at a current density of 0.75 mA/cm$^2$ to 4.3 V (vs. Li/Li$^+$) and then discharged at a current density of 0.75 mA/cm$^2$ to 2.75 V (vs. Li/Li$^+$) to determine a capacity (mAh/g) per gram of the positive active material. Next, the constructed cell was charged at a current density of 0.75 mA/cm$^2$ to 4.3 V (vs. Li/Li$^+$) and then discharged at a current density of 3.0 mA/cm$^2$ to 2.75V (vs. Li/Li$^+$) to determine a capacity (mAh/g) per gram of the positive active material. Also, an average electrode potential during discharge at a current density of 0.75 mA/cm$^2$ was calculated from the following equation. The same testing was performed for the positive electrode before the storage test to compare characteristics of the positive electrode before and after the storage test.

[Average electrode potential (V vs. Li/Li$^+$)]= [gravimetric energy density (mWh/g) during discharge]÷[capacity (mAh/g) per gram of positive active material]

The results of the charge-discharge test at discharge currents of 0.75 and 3.0 mA/cm$^2$ are shown in Tables 4 and 5, respectively.

TABLE 4

| Positive Electrode of Comp. Ex. 1 | Discharge Capacity (mAh/g) | Energy Density (mWh/g) | Average Electrode Potential (V vs. Li/Li$^+$) |
|---|---|---|---|
| Before Storage Test | 158.3 | 602.8 | 3.807 |
| After Storage Test | 155.6 | 589.3 | 3.787 |

TABLE 5

| Positive Electrode of Comp. Ex. 1 | Discharge Capacity (mAh/g) | Ratio of Discharge Capacity at 3.0 mA/cm$^2$ to Discharge Capacity at 0.75 mA/cm$^2$ (%) |
|---|---|---|
| Before Storage Test | 145.8 | 92.1 |
| After Storage Test | 143.5 | 92.2 |

As apparent Tables 4 and 5, the difference in performance of the positive electrode before and after storage was little appreciated. This appears to demonstrate that the positive electrode or its active material experiences no deterioration in high-temperature storage.

(Measurement of XRD Pattern Before and After Storage)

Figure 9:
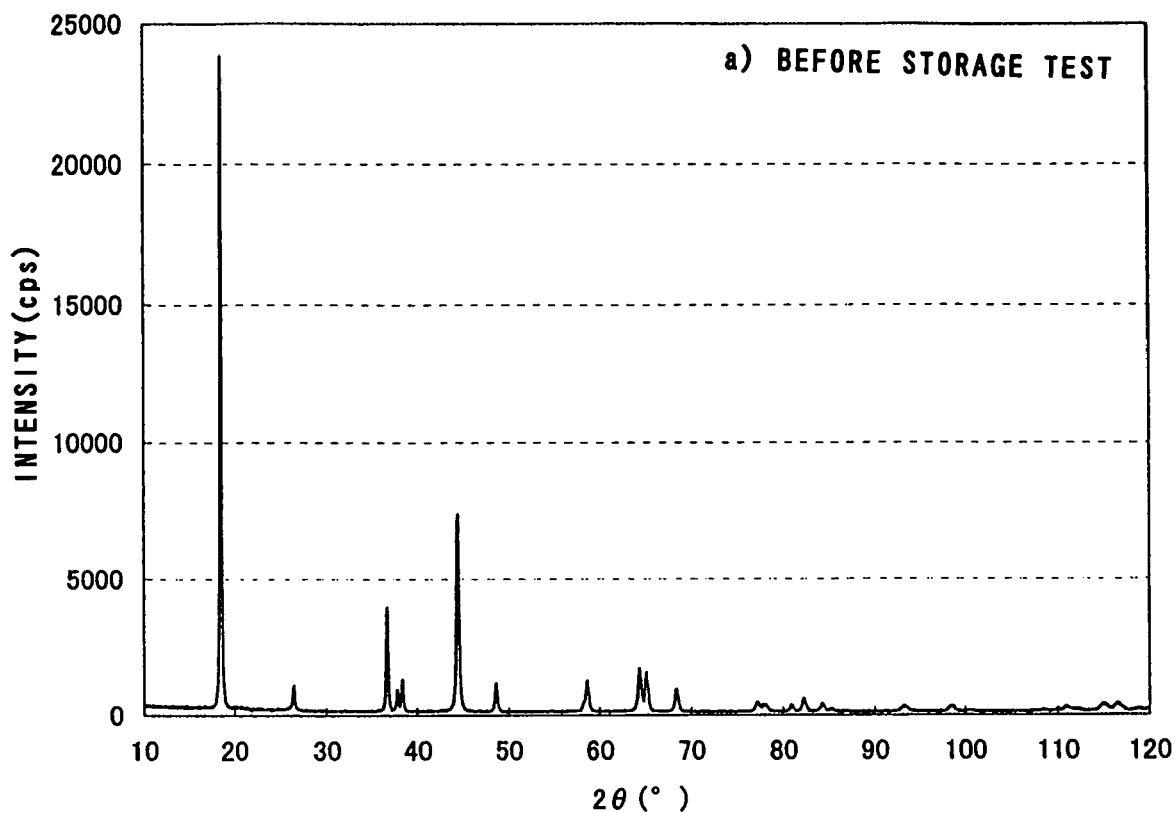
FIG. 9 is a chart showing an XRD pattern of the positive electrode of the battery of Comparative Example 1 before the storage test.
Figure 10:
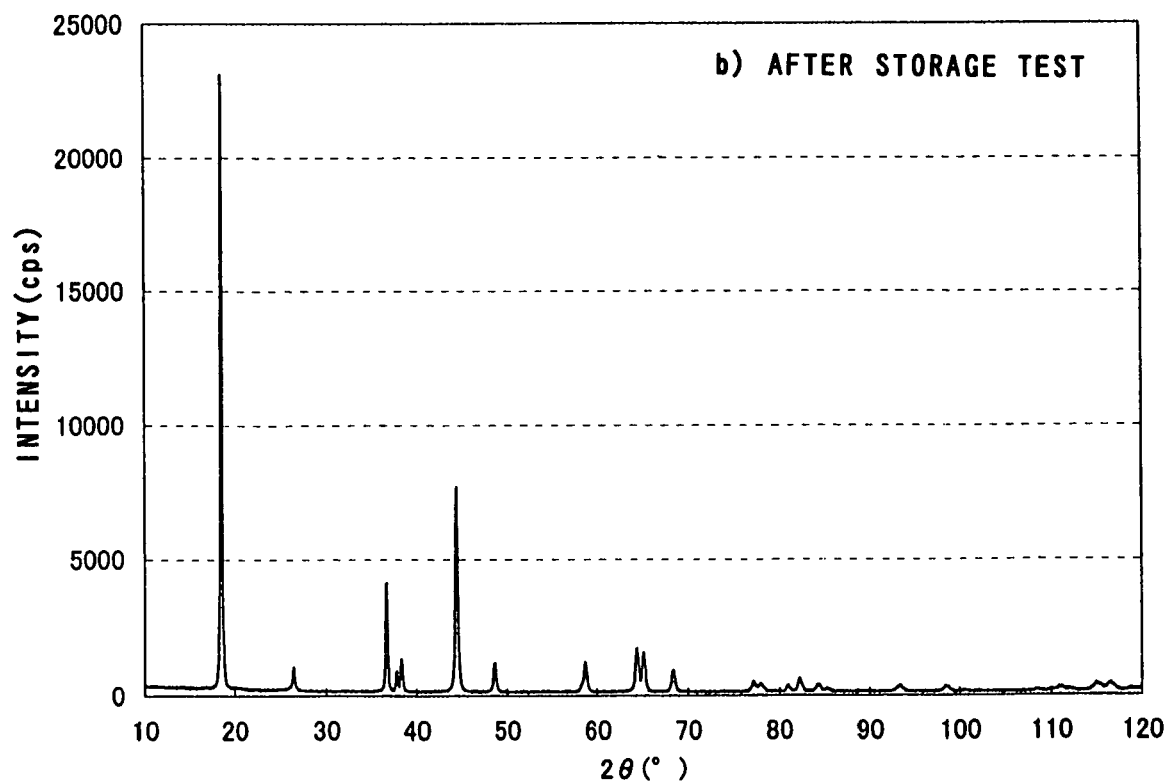
FIG. 10 is a chart showing an XRD pattern of the positive electrode of the battery of Comparative Example 1 after the storage test.

The preceding positive electrode (in the discharged state) collected after the storage test and the positive electrode before the storage test were both subjected to x-ray diffraction measurement using Cu—Kα as an X-ray source. The measurement results are shown in FIGS. 9 and 10. FIG. 9 shows an XRD pattern for the positive electrode before the storage test and FIG. 10 shows an XRD pattern for the positive electrode after the storage test. As can be appreciated from comparison between FIGS. 9 and 10, the change in XRD pattern of the positive electrode before and after the storage test is not significant. It is therefore believed that no structural change occurs in the positive active material before and after the storage test.

From the foregoing, it appears that deterioration of the battery during storage is unlikely due to the structural change of the positive active material or deterioration of the positive electrode but more likely due to a gas generated during storage that stays between the electrodes to cause uneven occurrence of a charge-discharge reaction. In accordance with the present invention, gas generation during storage can be suppressed. Therefore, deterioration of battery characteristics during storage can also be suppressed.

(Reference Experiment 3)

In this Experiment, the influence of the different pH measurement procedures, i.e., those disclosed in the present invention and in Japanese Patent Laying-Open No. 2002-203552, on the measured pH value was investigated. The measurement procedures described in the present invention and Japanese Patent Laying-Open No. 2002-203552 were utilized to measure respective pH values of the positive active materials of Example 1 and Comparative Example 2. The measurement results are shown in Table 6.

According to the measurement procedure of the present invention, 5 g of each positive active material was introduced in 50 ml of purified water, the resultant was ultrasonically treated for 10 minutes and then filtered, and a pH value of the resulting filtrate was measured. According to the measurement procedure of Japanese Patent Laying-Open No. 2002-203552, 2 g of each positive active material was introduced in 100 ml of purified water, the resultant was ultrasonically treated for 10 minutes and then filtered, and a pH value of the resulting filtrate was measured.

TABLE 6

| | pH Value Measured According to a Procedure of the Present Invention | pH Value Measured According to a Procedure of Patent Literature 5 | pH Value Difference |
|---|---|---|---|
| Ex. 1 | 10.66 | 9.96 | 0.72 |
| Comp. Ex. 2 | 11.64 | 10.92 | 0.70 |

Compared with the measurement procedure of Japanese Patent Laying-Open No. 2002-203552, the measurement procedure of the present invention introduces a fivefold amount of the active material into a unit volume of purified water. It is therefore expected that when the active material is immersed in water, an alkali concentration in the measurement procedure of the present invention is five times as high as in the other measurement procedure. Accordingly, the pH value is estimated to increase by log 5, i.e., about 0.70. The experiment results shown in Table 6 indicate pH values as such estimated. The pH value when obtained by the measurement procedure of the present invention is therefore regarded as being about 0.70 higher than when obtained by the measurement procedure of Japanese Patent Laying-Open No. 2002-203552.

(Reference Experiment 4)

The batteries of Comparative Examples 1 and 2 while both in the discharged state (650 mA, end voltage of 2.75 V) were subjected to the same storage test as described above to observe swelling thereof before and after storage and deterioration thereof in storage. Since they were stored in the discharged state, measurement of the remaining capacity after storage was not carried out. After storage, each battery was cycled under the same charge-discharge conditions as in Example 1 to measure a restored capacity and a restoration rate. The measurement results are shown in Table 7.

TABLE 7

| | Battery | Battery Swelling After High-Temperature Storage (mm) | Discharge Capacity Before Storage (mAh) | Restored Capacity (mAh) (Restoration Rate) |
|---|---|---|---|---|
| Comp. Ex. 1 | B1 | 0.161 | 664.0 | 658.3 (99.1%) |
| Comp. Ex. 2 | B2 | 0.096 | 695.6 | 690.9 (99.3%) |

As can be appreciated from comparison between Tables 1, 2 and 7, even the batteries of Comparative Examples 1 and 2 experience little swelling and deterioration in storage, if they are stored in the discharged state. This demonstrates that batteries using the positive active material of the present invention experience swelling and deterioration only when they are stored in the charged state. Therefore, the occurrence of gas generation and battery swelling during high-temperature storage is believed due to some factor other than a reaction between a residual alkali content and an electrolyte solution or gas release from the residual alkali content.

UTILITY IN INDUSTRY

The use of a lithium transition metal complex oxide having the particular BET specific surface area and pH value as the positive electrode material, in accordance with the present invention, retards gas generation within a battery during high-temperature storage in the charged state, restrains swelling of the battery and suppresses deterioration of battery characteristics in high-temperature storage.

The invention claimed is:

1. In a nonaqueous electrolyte secondary battery using a material capable of storing and releasing lithium as a negative electrode material and a lithium transition metal complex oxide containing Ni and Mn as the transition metal and having a layered structure as a positive electrode material, said secondary battery being characterized in that said lithium transition metal complex oxide has a BET specific surface area of less than 3 m²/g and gives a pH value within the range of 10.61-11.0 when it is immersed in purified water in the amount of 5 g per 50 ml of the purified water, and that an outer casing of said battery is composed at least partly of an aluminum alloy or aluminum laminate film having a thickness of up to 0.5 mm and susceptible to deformation in case of internal pressure buildup due to gas generation within the battery during storage.

2. The nonaqueous electrolyte secondary battery as recited in claim 1, characterized in that said lithium transition metal complex oxide is represented by the formula $Li_aMn_xNi_yCo_zO_2$ (wherein a, x, y and z are numbers satisfying $0 \leq a \leq 1.2$, x+y+z=1, x>0, y>0 and $z \geq 0$).

3. The nonaqueous electrolyte secondary battery as recited in claim 1, characterized in that said lithium transition metal complex oxide contains, substantially the same amount of nickel and manganese.

4. The nonaqueous electrolyte secondary battery as recited in claim 1, characterized in that said lithium transition metal complex oxide has a BET specific surface area of not greater than 2 m²/g.

5. The nonaqueous electrolyte secondary battery as recited in claim 2, characterized in that said lithium transition metal complex oxide contains substantially the same amount of nickel and manganese.

6. The nonaqueous electrolyte secondary battery as recited in claim 2, characterized in that said lithium transition metal complex oxide has a BET specific surface area of not greater than 2 m²/g.

7. The nonaqueous electrolyte secondary battery as recited in claim 3, characterized in that said lithium transition metal complex oxide has a BET specific surface area of not greater than 2 m²/g.

8. The nonaqueous electrolyte secondary battery as recited in claim 5, characterized in that said lithium transition metal complex oxide has a BET specific surface area of not greater than 2 m²/g.

* * * * *